(12) United States Patent
Henze

(10) Patent No.: US 11,320,807 B2
(45) Date of Patent: May 3, 2022

(54) CONTROL DEVICE FOR A CONVEYOR DEVICE

(71) Applicant: INTERROLL HOLDING AG, Sant' Antonino (CH)

(72) Inventor: Herbert Henze, Sant' Antonino (CH)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 16/770,166

(22) PCT Filed: Dec. 10, 2018

(86) PCT No.: PCT/EP2018/084096
§ 371 (c)(1),
(2) Date: Jun. 5, 2020

(87) PCT Pub. No.: WO2019/110841
PCT Pub. Date: Jun. 13, 2019

(65) Prior Publication Data
US 2020/0387142 A1    Dec. 10, 2020

(30) Foreign Application Priority Data
Dec. 8, 2017   (DE) .................... 10 2017 129 318.3

(51) Int. Cl.
*G05B 19/00*  (2006.01)
*G05B 19/418*  (2006.01)
(Continued)

(52) U.S. Cl.
CPC ....... *G05B 19/4182* (2013.01); *G06F 1/3253* (2013.01); *G06F 1/3296* (2013.01);
(Continued)

(58) Field of Classification Search
CPC ....................................................... G06F 1/32
See application file for complete search history.

(56) References Cited

U.S. PATENT DOCUMENTS

2006/0030968 A1* 2/2006 Ko ..................... H01R 27/00
700/213
2012/0290126 A1* 11/2012 Combs .............. G05B 19/4189
700/230

FOREIGN PATENT DOCUMENTS

BR   102014018296   2/2016
CN      102449566   5/2012
(Continued)

*Primary Examiner* — Paul B Yanchus, III
(74) *Attorney, Agent, or Firm* — Price Heneveld LLP

(57) ABSTRACT

A control device for a conveyor device, comprises a control unit adapted to generate control signals for a conveyor device, a data interface adapted for signal transmission of control signals to the control unit, a first power interface adapted for power supply to the control unit, a connection interface adapted for establishing a signal control connection and a power supply connection between the control unit and a conveyor device located outside the control device. A second power interface is adapted to supply power to the control unit, the first interface being adapted to receive a power supply in the form of a power supply with a first voltage, the second interface being adapted to receive a power supply in the form of a power supply with a second voltage or, instead of the second voltage, with a third voltage whose level is different from the level of the second voltage.

20 Claims, 1 Drawing Sheet

(51) Int. Cl.
 *G06F 1/3234* (2019.01)
 *G06F 1/3296* (2019.01)
(52) U.S. Cl.
 CPC .............. *G05B 2219/15091* (2013.01); *G05B 2219/33196* (2013.01)

(56) References Cited

FOREIGN PATENT DOCUMENTS

| | | |
|---|---|---|
| CN | 103508176 | 1/2014 |
| DE | 29710056 | 8/1999 |
| DE | 102009011225 | 5/2010 |
| EP | 0891008 | 1/1999 |
| EP | 1886742 | 2/2008 |

* cited by examiner

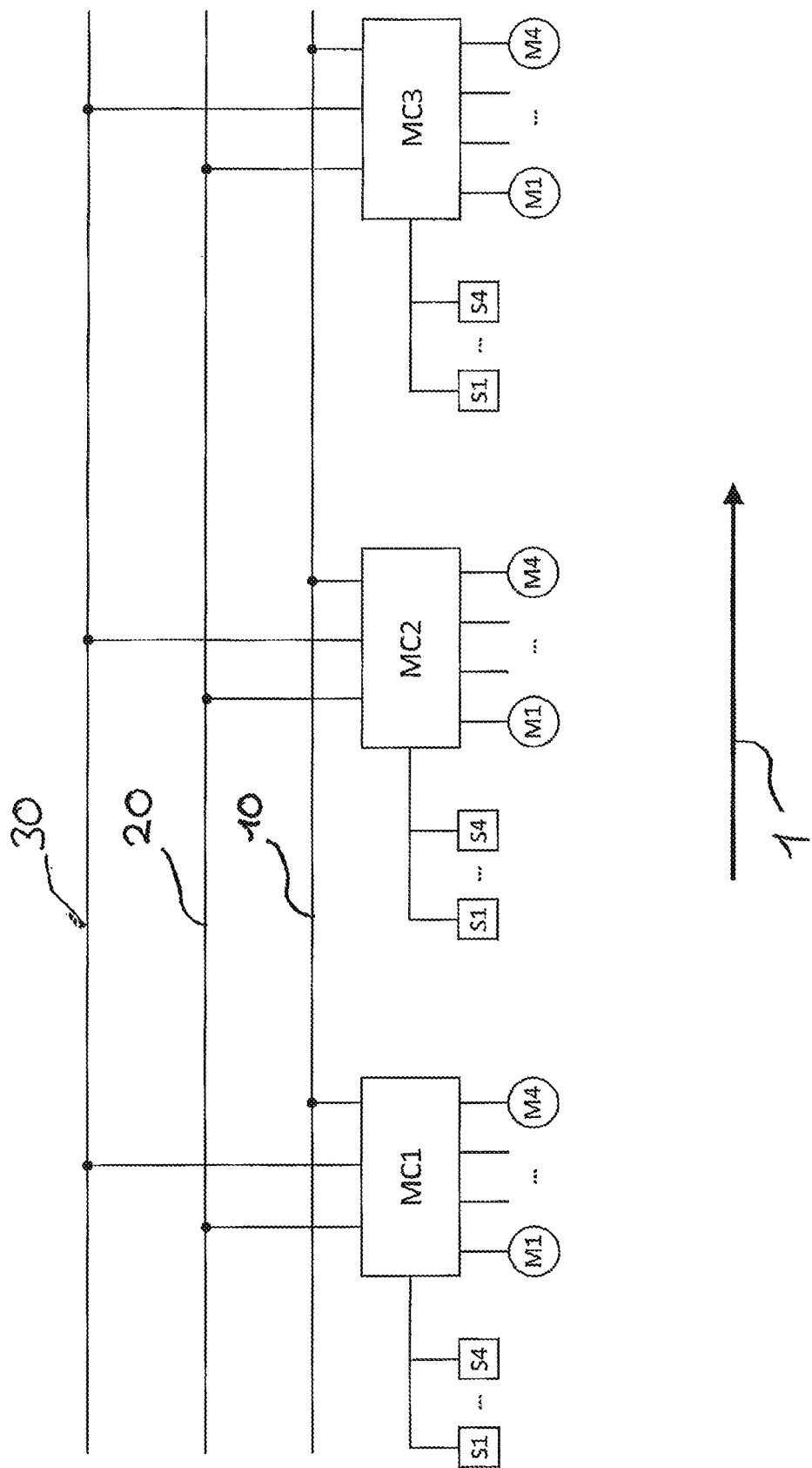

CONTROL DEVICE FOR A CONVEYOR DEVICE

CROSS-REFERENCE TO FOREIGN PRIORITY APPLICATION

The present application claims the benefit under 35 U.S.C. §§ 119(b), 119(e), 120, and/or 365(c) of PCT/EP2018/084096 filed Dec. 10, 2018, which claims priority to German Application No. 10 2017 129 318.3 filed Dec. 8, 2017.

FIELD OF THE INVENTION

The invention relates to a control device for a conveyor device, comprising: a control unit adapted to generate control signals for a conveyor device, a data interface adapted for signal transmission of control signals to the control unit, a first power interface adapted for power supply to the control unit, a terminal interface adapted for establishing a signal control connection and a power supply connection between the control unit and a conveyor device located outside the control device. Another aspect of the invention is a method of operating a conveyor.

BACKGROUND OF THE INVENTION

Conveyor devices are generally used to move goods along a conveyor line. A conveying device in the sense of the invention is generally understood to be a device which is adapted to perform such a conveying task. In particular, conveyor devices are to be understood to comprise a conveyor section in which several conveyor rollers are installed, some of which are motor-driven, in order to convey a product to be conveyed which is resting on the conveyor rollers along the conveyor section.

It is known for conveyor devices to control the conveyor equipment, for example, the motor-driven conveyor roller, via a control device. The control device typically transmits control signals to the conveyor, for example a start-stop signal or a speed signal to control the speed of the conveyor. Logical control sequences, for example, in the manner of a train release along the conveyor line or in the manner of a single release along the conveyor line, are controlled by these control devices by means of this signal transmission. It is also known to supply the conveying device also via the control device with the energy required to carry out the conveying process, i.e., the driving energy for the motor which effects the conveying action. Often this supply of energy takes place via a multi-core cable, which also serves to transmit control signals, but in principle this can also be done via separate cables and correspondingly separate connections.

While such a design of conveying devices has proven itself due to the systematically good configuration thus achieved for installation, maintenance, and the exchangeability of defective components, a problem inherent in this system design is that different requirements are placed on the energy supply for control logic tasks in the conveying device on the one hand and performance requirements for the actual conveying capacity on the other. In the area of logical control, it is preferable for an economical and, from the operator's point of view, safe design to perform the logical functions with low voltages and currents. On the other hand, in the area of power supply, in order to achieve high conveying capacities, it is desirable to transmit high energies, in particular, to transmit a high voltage, in order to be able to avoid an increase in cur-rent intensity with the associated necessity of increasing the cross-section of the supply lines.

Meeting these different requirements with a configuration where a high voltage is used for power supply and a low voltage for logic supply will cause various problems. On the one hand, the connection method, which is advantageous for a simple system design, with a direct application of power and control signals from the control device to the conveyor system with such a separate power supply involves an undesirable additional effort. In addition, there is a need for additional cabling, which makes installation and planning and the replacement of components of the conveyor device more difficult.

The execution of safety-relevant functions, such as an emergency shutdown function, is also problematic. In principle, it is desirable to be able to motionlessly switch conveyors on which operators are working by means of a quick emergency shutdown function, but at the same time to achieve a quick restart with a guarantee of the continuation of the control logic programming before the emergency shutdown. The implementation of such an emergency shutdown function when using several supply voltages therefore requires additional effort, which, in turn, can be reflected in costs for manufacturing, installation and maintenance of the conveying direction.

Finally, a disadvantage of providing two voltages is that incorrect connections can be made during assembly, which can potentially cause the high voltage to overload power to logic units or peripheral units used in the conveyor, which can damage these units or the logic units themselves.

A further problem is that on the one hand there can be conveyor sections within a single conveyor that have high demands on the conveying capacity, but on the other hand there can also be conveyor sections that do not have such high demands on the conveying capacity and therefore allow the use of low-cost conveyor systems with low conveying capacity. In addition, control devices are used for conveyors which have high demands on the conveying capacity overall, but also for conveyors which have only low demands on the conveying capacity and therefore allow the use of conveyors with low conveying capacity which can be manufactured at lower costs.

The invention is based on the task of providing a conveying device which achieves a high conveying capacity while avoiding or at least reducing these disadvantages.

SUMMARY OF THE INVENTION

According to the invention, the task is solved by a second energy interface which is adapted for an energy supply to the control unit, the first interface being adapted to receive an energy supply in the form of a voltage supply with a first voltage, the second interface being adapted to receive an energy supply in the form of a voltage supply with a second voltage or, instead of the second voltage, with a third voltage whose level is different from the level of the second voltage.

The invention provides a control device having a first and a second power interface. The first interface is adapted to receive a first voltage. The second interface is adapted to receive a second voltage or, instead of the second voltage, a third voltage different from the second voltage. Consequently, a first interface used to supply power to a control unit that performs logic control steps is a first interface capable of receiving a first voltage of low magnitude. The second interface is used to receive the voltage necessary to supply power to the conveyor, it is adapted to receive two different voltages selectively, such that driving with two different selectable voltages as power supply is possible. On the one hand, this ensures that the control device according to the invention is also capable of using a low, second voltage as power supply voltage in a conventional manner, but, alternatively, also of using a high, third voltage as power supply voltage and achieving a correspondingly high conveying capacity. This makes it possible that the control device according to the invention is used for conventional control tasks with no special demands on the conveying capacity, but at the same time can be used to control conveying tasks with high demands on the conveying capacity. This is achieved without having to adapt the control logic components within the control device, so that a uniform design and production of the logical control components is ensured.

In particular, the second or third voltage can be passed on directly to the connection interface to supply a conveyor system connected to it.

With the control device according to the invention, it is possible to conduct and switch a logic voltage supply and a power voltage supply separately. The power voltage supply can assume two different voltage levels, which basically makes it possible to supply low-cost conveyors with a low voltage and high-power conveyors with a high voltage. The control device according to the invention is therefore suitable for setting up conveyor systems with such low-cost conveying devices and for setting up conveyor systems with high-performance conveying devices and can also be used within a conveyor system to control and supply power to a low-cost conveying device with one control device and to a high-performance conveying device with another control device, if the corresponding power voltage supply is supplied to these control devices. It is also possible to switch off only the power voltage supply in the context of an emergency shutdown, but to maintain the logic voltage supply at the first energy interface and thereby enable a quick restart of the conveyor system without having to execute initialization data and transmission processes.

In this context, an interface is generally understood to provide a possible connection in the sense of establishing a connection for transmission. This can be a conventional socket-plug connection and the control device may have a socket or plug for this purpose. This can also be a differently adapted connection of a cable, for example with piercing pin contacts. In particular, a wireless interface may also be provided for the signal data transmitting interface of the invention. In principle, an interface according to the invention can be implemented by an integral connection element or data transmission protocol, but also be provided by two or more connection elements separated from each other. Likewise, two or more interfaces of the invention can be combined in one connection element or data transmission protocol. The interfaces of the invention are to be understood in such a way that they can be adapted as pure input or pure output interfaces, but also and preferably as I/O interfaces which enable both input and output of data and/or power. On the one hand, this enables communication of the control device according to the invention with peripheral devices connected to it in both directions or with a superior or secondary control unit. Further, this makes it possible that a power is supplied to a conveying device via the control device according to the invention, and that power is also fed back from a conveying device into a supply network, for example, in the course of a braking process during which the conveying device generates electrical energy.

According to a first preferred embodiment, the control unit is adapted to perform control functions with the first voltage and to supply the second or third voltage supplied at the second interface via the connection interface as power supply to the conveyor device.

According to this design, the first voltage is used to perform logical and control functions of the control device and the second or third voltage is used to supply the conveyor with energy, i.e. to provide a driving power. This does not exclude the possibility that the second or third voltage is also used to supply power to logical processes within the conveyor equipment.

In accordance with another preferred embodiment, the control unit is provided with an electronic fault detection unit adapted to be supplied with a voltage at the level of the second or third voltage from the first interface and to generate a fault connection function when a voltage different in magnitude from the first voltage is supplied to the first interface.

This version addresses a specific problem that can occur in the invention when different voltages are connected to the first and second energy interface. In principle, various incorrect connections or incorrect wiring methods can inadvertently apply one of the second or third voltages to the first interface. This potentially triggers the risk of damaging the control unit or damaging components supplied from the first power interface. To counter this risk, the control unit includes an electronic fault detection unit which is adapted in such a way that it does not suffer any damage by being supplied with the second or third voltage, but instead generates a fault connection function. This fault connection function can generally be a function that reduces or blocks the voltage applied to the first energy interface, does not feed it to other, sensitive components of the control unit but blocks it or includes other protective functions. Basically, it is to be understood that the fault connection function is to be such a function which prevents damage to the control unit according to the invention. This prevention can be achieved by a manually resetting fault connection function, for example, a fuse, or can be generated automatically when the second or third voltage on the first energy interface is lost.

It is particularly preferable if the fault connection function of the connection causes the voltage at the level of the second or third voltage not to be passed on to a logic control circuit integrated in the control unit and adapted to control the conveyor.

According to this design, the fault connection function blocks the application of the faulty voltage to a voltage-sensitive logic control circuit contained in the control unit, thereby preventing damage to the relevant logic components within the control unit.

It is even further preferred in this respect when the invention is further developed by a peripheral connection interface, which is adapted to establish a signal control connection and a power supply connection between the control unit and a peripheral unit, in particular, a sensor, arranged outside the control device, wherein the fault connection function has the effect that the voltage at the level of the second or third voltage is not passed on to the peripheral unit via the peripheral connection interface.

According to this embodiment, the control device also supplies one or more peripheral devices via one or correspondingly more peripheral connection interfaces. This supply is preferably provided by the first voltage from the first power interface. The fault connection function ensures that faulty voltage applied to the first power interface is not passed on to such a peripheral device and thus prevents damage to the peripheral device.

According to another preferred embodiment, it is provided that the height of the third voltage is higher than the height of the second voltage, in particular, twice as high.

Such an increase or doubling achieves the advantageous effect of an increased conveying capacity. In particular, doubling enables advantageous interconnection functions, which can also include, for example, emergency functions by halving the third voltage in order to reach the second voltage.

Even further, it is preferred that the level of the second voltage and the level of the first voltage are the same.

This embodiment ensures that the voltage for supplying the control elements and the power supply voltage are identical at the level of the second voltage, making the control device compatible with the use of numerous peripheral devices and conveyors where a single voltage is used for control and conveyor performance purposes.

It is even more preferred if the conveyor is a motor-driven conveyor roller.

A motor-driven conveyor roller is characterized by the fact that a compact connection possibility with control and power supply for the conveying capacity must be provided, which can be implemented via a uniform interface or via two separate interfaces. Conveyor rollers therefore require a preferably high voltage for the conveyor power supply for the purpose of a high conveying capacity, but at the same time require a compact design of control elements integrated in the conveyor roller for any control engineering control, which can be achieved in particular by a low voltage for control purposes.

It is generally preferred that the connection interface is formed by a logic connection interface and a separate power connection interface or that the connection interface integrally comprises a logic connection interface and a power connection interface.

In accordance with this design, the control connection of the conveyor system and the power connection of the conveyor system is carried out either via separate interfaces or via an integral interface.

A further aspect of the invention is a method of operating a conveyor device comprising the steps of supplying a logic supply voltage to a control device via a first power interface, supplying a power supply voltage to the control device via a second power interface, providing a motor supply voltage from the power supply voltage at a terminal interface, wherein as power supply voltage a first voltage having a first voltage level or instead of the first voltage a second voltage whose voltage level is different from the voltage level of the first voltage is supplied to the second power interface.

The method may be continued by monitoring the level of the logic supply voltage connected to the first power interface by a misconnection control unit and interrupting a transfer of a voltage to an electronic control unit supplied from the first power interface if it is determined that the level of the voltage connected to the first power interface exceeds a predetermined value.

The method can be further developed by supplying the logic supply voltage to a peripheral device via a peripheral connection interface.

Further, the method can be improved by interrupting the supply of the logic supply voltage via the peripheral power interface to the peripheral device if it is determined that the level of the logic supply voltage connected to the first power interface exceeds a predetermined value.

The method according to the invention is particularly suitable for carrying out a powerful conveying operation with simultaneous cost-effective and efficient control with two different voltages to the control supply and power supply. The cost advantages are primarily achieved by smaller required cross sections of the power supply lines. In this respect, the method according to the invention provides a special safety against faulty connection or wiring or other malfunctions. At the same time, the method achieves a fast emergency shutdown and restart possibility after emergency shutdown. Basically, it is to be understood that the method according to the invention can be advantageously carried out with the previously explained control device as a component of the conveying device in order to control and supply the conveying devices within the conveying device with power. Therefore, the procedural steps that can be achieved with the corresponding embodiments of the control devices can be correspondingly implemented in the method according to the invention and it is to be understood that the advantages of the control device explained in this context also apply correspondingly to the method according to the invention.

BRIEF DESCRIPTION OF THE DRAWING

A preferred embodiment of the invention is explained in more detail in the attached FIGURE. The FIGURE shows a schematic circuit diagram of a section of a conveyor device according to the invention.

DETAILED DESCRIPTION OF THE EMBODIMENTS

The section shown in the FIGURE represents the schematic circuit diagram of a conveyor section within a conveyor system. The conveyor section extends along an arrow 1, which characterizes the conveying direction. A number of motor-driven conveyor rollers M1 . . . M4 are arranged along the conveyor section. Each of the motor-driven conveyor rollers M1 . . . M4 is connected to a control unit MC1 . . . MC3 to be controlled by it.

In total, the section shown in the FIGURE shows three control units MC1, MC2, MC3, with one to four motor-driven conveyor rollers M1 . . . M4 are connected to each control unit MC1, MC2, MC3. Thus, a total of up to twelve motor-driven conveyor rollers M1 . . . M4 in the section of the conveyor device shown in the FIGURE are supplied from the respective control unit MC1, MC2, MC3 both with the electrical energy required to drive the motor-driven conveyor roller and with control data in order to control starting processes, braking processes, conveyor speeds, and the like for each of the motor-driven conveyor rollers M1 . . . M4. In principle, a signal can also be transmitted from the motor-driven conveyor roller M1 . . . M4 to the control unit MC1, MC2, MC3, in order to be introduced as an input signal into the control process or into higher-level processes outside the control unit MC1, MC2, MC3.

In addition to the motor-driven conveyor rollers M1 . . . M4, it is also possible to connect up to four sensors S1 . . . S4 to each of the control units MC1, MC2, MC3. These sensors S1 . . . S4 are in turn coupled to the control unit MC1, MC2, MC3 in terms of both signals and energy, so that any electrical energy required to operate the sensor S1 . . . S4 is fed from the control unit MC1, MC2, MC3 to the sensor S1 . . . S4 and signals from the sensor S1 . . . S4 or to the sensor S1 . . . S4 are also fed via the control unit MC1, MC2, MC3. Basically it is to be understood that both the signal line of the sensors S1 . . . S4 as well as the signal line of the motor-driven conveyor rollers M1 . . . M4 can take place as an analog signal or as a digital signal. The signal coupling between the sensors S1 . . . S4 and the control unit MC1, MC2, MC3 and the motor-driven conveyor rollers M1 . . . M4 and the control unit MC1, MC2, MC3 can therefore be implemented by an analogue signal line or by a digital signal line such as a bus line. In particular, it is also possible that the control unit MC1, MC2, MC3 is adapted to carry out both an analog signal coupling to a sensor S1 . . . S4 or a motor-driven conveyor roller M1 . . . M4 and a digital signal coupling to a sensor S1 . . . S4 or a motor-driven conveyor roller M1 . . . M4, which can be carried out by means of corresponding adaptive interfaces or by several alternative interfaces.

The control units MC1, MC2, MC3 are connected to a data bus line 10. In the case shown, the data bus line 10 is configured as a bus topology, but other network topologies such as a ring-, star-, or tree-topology or hybrid topology forms are also possible for the conveyor device according to the invention. Via the data bus line 10, the control units MC1, MC2, MC3 receive control signals which serve to control the motor-driven conveyor roller M1 . . . M4 and/or the sensors S1 . . . S4 connected to the control unit. Furthermore, the control units MC1, MC2, MC3 can send data signals to a central control unit or to other control units MC1, MC2, MC3 via the data bus line 10. These can be, for example, data signals coming from one of the sensors S1 . . . S4 or from one of the motor-driven conveyor rollers M1 . . . M4 connected to the respective control unit.

Each of the control units MC1, MC2, MC3 is further connected to a logic voltage line 20. The connection to the logic voltage line 20 is also implemented in a bus topology, for example, by inserting the logic voltage line 20 directly into a recess in the housing of the control unit MC1, MC2, MC3 and making electrical contact by means of two or more contacting pins which pierce the insulation of the logic voltage line 20. The topology of the logic voltage line 20 can also be adapted in a different structure in other applications, as with the data bus line 10. Preferably the network topology of the logic voltage line 20 and the data bus line 10 is identical. In this example, the logic voltage line is a 24 V voltage line and supplies each of the control units MC1, MC2, MC3 with this 24 V voltage. This logic voltage of 24 volts is used to operate and maintain the control processes, the processing of data signals and, if necessary, the storage of data signals within each of the control units MC1, MC2, MC3. With this logic voltage supply of 24 volts, the sensors S1 . . . S4 can also be supplied with voltage and, if present, sensor components connected to one of the motor rollers M1 . . . M4 can be supplied with this logic voltage supply. For this reason, no high demands are placed on the logic voltage supply with regard to the transferable electrical energy, so that the logic voltage supply line 20 can be adapted with a small cross section.

Each of the control units MC1, MC2, MC3 is additionally connected to a power supply line 30. Here, too, the connection is implemented via a bus topology, which can be implemented using penetration technology, for example, as with the logic voltage line 20. A different topology can also be used for the power supply line 30, as explained above, and it is preferable that the topology of the power supply line 30 is identical to the topology of the data bus line 10 and/or the logic voltage line 20. According to the invention, the power supply line 30 can be supplied with a first voltage of 24 volts or with a second voltage of 48 volts. The power supply line 30 is used to supply an operating voltage or drive voltage to the motor-driven conveyor rollers M1 . . . M4. This drive voltage is used to supply the drive inside the motor-driven conveyor rollers M1 . . . M4 with energy and, therefore, requires a higher electrical energy than the logic voltage supply from logic voltage line 20.

Basically it is to be understood that the logic voltage supply line 20 and the power supply line 30 are adapted as separate lines. Similarly, as in the design example, the data bus line 10 can be adapted as a separate line, but it is also possible to send data signals via the logic voltage supply line 20 or the power supply line 30 or both and thus save the data bus line or to design it integrally with the logic voltage supply line 20 or the power supply line 30. In principle, it should also be understood that the data bus line 10, the logic voltage supply line 20, and the power supply line 30 can each be provided as separate lines or two or three of these lines can be bundled together to form a multiple line.

The power supply voltage is fed to the drives of the motor-driven conveyor rollers M1 . . . M4 via the control units MC1, MC2, MC3. The control units MC1, MC2, MC3 are adapted to alternatively supply the first power supply voltage of 24 V or the second power supply voltage of 48 V to the motor-driven conveyor rollers M1 . . . M4. In this way, motor-driven conveyor rollers M1 . . . M4 whose drive power is supplied with a drive voltage of 24 volts and/or motor-driven conveyor rollers M1 . . . M4 whose drive power is supplied with a drive voltage of 48 volts can be connected to the control units. In principle, it is possible that motor-driven conveyor rollers M1 . . . M4 are connected with only one of the two possible drive voltages, which are then supplied with the drive voltage that is present in the power supply line 30. Alternatively, the second drive voltage of 48 volts can also be applied in the power supply line 30 and the control units MC1, MC2, MC3 can be supplied in order to supply motor-driven conveyor rollers M1 . . . M4 with this second voltage and at the same time to supply motor-driven conveyor rollers M1 . . . M4 connected to this control unit with the first voltage. In this case, the control unit is adapted to transform the second drive voltage of 48 volts so that a first drive voltage of 24 volts is provided for these motor-driven conveyor rollers M1 . . . M4. This can be done, for example, by means of voltage divider or a transformer (DC/DC converter).

In the case of a necessary, immediate, and safe shutdown of the conveyor device, the power supply can be interrupted via the power supply line 30 in the design in accordance with the invention, so that no drive voltage is applied to the power supply line 30. In this case, the motor-driven conveyor rollers M1 . . . M4 are immediately not supplied with drive voltage, so that they come to an immediate standstill. In this situation, the logic voltage line 20 can continue to be supplied with 24 volts so that, on the one hand, data loss can be avoided and, on the other hand, the entire conveyor device is switched on and remains in operation with regard to the control data. This makes it possible to restart the conveyor after such a stop without the need for an actual control restart or start-up process. In particular, this maintained logic supply voltage allows any sensor data, any control data generated from it, and any control processes to be continued in exactly the same way and from exactly the same point in time as the point in time of the immediate stop.

The invention claimed is:
1. A control device for a conveyor, comprising:
   a control unit adapted to generate control signals for a conveyor device;
   a data interface adapted for signal transmission of control signals to the control unit;

a first energy interface adapted for an energy supply to the control unit;
a connection interface adapted to establish a signal control connection and a power supply connection between the control unit and a conveyor unit located outside the control device;
a second energy interface adapted for supplying energy to the control unit;
wherein the first energy interface is adapted to receive a power supply in the form of a power supply with a first voltage and the second energy interface is adapted to receive a power supply in the form of a power supply with a second voltage or, instead of the second voltage, with a third voltage having a level that is different from a level of the second voltage;
wherein the second energy interface is adapted to optionally receive two different voltages, such that a drive with two different selectable voltages may be supplied with the power supply with the second voltage or the power supply with the third voltage; and
wherein the level of the third voltage is twice as high as the level of the second voltage and the second or third voltage is directly forwarded to the connection interface in order to supply the conveyor device connected thereto.

2. The control device according to claim 1, wherein the control unit is adapted to carry out control functions with the first voltage and to supply the second or third voltage supplied at the second energy interface via the connection interface as the power supply to the conveyor device.

3. The control device according to claim 1, wherein the control unit comprises an electronic fault detection unit adapted to be supplied with a voltage at the level of the second or third voltage from the first energy interface.

4. The control device according to claim 1, wherein the control unit generates a fault connection function when a voltage different in level from the first voltage is supplied to the first energy interface.

5. The control device according to claim 4, wherein the fault connection function causes the voltage at the level of the second or third voltage, respectively, not to be passed on to a logic control circuit integrated in the control unit and adapted to control the conveyor device.

6. The control device according to claim 4, wherein a peripheral connection interface is adapted to establish a signal control connection and a power supply connection between the control unit and a peripheral unit arranged outside the control device, the fault connection function having the effect that the voltage at the level of the second or third voltage is not passed on to the peripheral unit via the peripheral connection interface.

7. The control device according to claim 6, wherein the peripheral unit is a sensor.

8. The control device according to claim 1, wherein the first voltage is used to perform a logical function and a control function of the control device.

9. The control device according to claim 1, wherein the voltage level of the second voltage and the voltage level of the first voltage are equal.

10. The control device according to claim 1, wherein the conveying device is a motor-driven conveying roller.

11. The control device according to claim 1, wherein the connection interface is composed of a logic connection interface and a power connection interface separate therefrom.

12. The control device according to claim 1, wherein the connection interface integrally comprises a logic connection interface and a power connection interface.

13. A method of operating a conveyor device comprising the steps of:
supplying a logic supply voltage to a control device via a first power interface;
supplying a power supply voltage to the control device via a second power interface;
providing a motor supply voltage from the power supply voltage at a connection interface;
wherein a first voltage having a first voltage level or, instead of the first voltage, a second voltage having a voltage level is different from a voltage level of the first voltage is fed to the second power interface as the power supply voltage;
wherein optionally one of two different voltages is received at the second power interface, such that a drive with two different selectable voltages may be supplied with the power supply with the second voltage or the power supply with a voltage; and
wherein a level of the third voltage is twice as high as the level of the second voltage and the second or third voltage is passed directly to the connection interface in order to supply a conveyor device connected thereto.

14. The method according to claim 13, wherein the level of the logic supply voltage connected to the first power interface is monitored by a misconnection control unit, and a transfer of a voltage to an electronic control unit supplied from the first power interface is interrupted if it is determined that the level of the voltage connected to the first power interface exceeds a predetermined value.

15. The method according to claim 13, wherein the logic supply voltage is supplied to a peripheral device via a peripheral connection interface.

16. The method according to claim 15, wherein the supply of the logic supply voltage via the peripheral connection interface to the peripheral device is interrupted if it is determined that the level of the logic supply voltage connected to the first power interface exceeds a predetermined value.

17. The method according to claim 15, wherein the peripheral unit is a sensor.

18. A conveyor comprising a motor-driven conveying roller controlled by a control device, the control device comprising:
a control unit adapted to generate control signals for a conveyor device;
a data interface adapted for signal transmission of control signals to the control unit;
a first energy interface adapted for an energy supply to the control unit;
a connection interface adapted to establish a signal control connection and a power supply connection between the control unit and a conveyor unit located outside the control device;
a second energy interface adapted for supplying energy to the control unit;
wherein the first energy interface is adapted to receive a power supply in the form of a power supply with a first voltage and the second energy interface is adapted to receive a power supply in the form of a power supply with a second voltage or, instead of the second voltage, with a third voltage whose level is different from the level of the second voltage;
wherein the second energy interface is adapted to optionally receive two different voltages, such that a drive with two different selectable voltages may be supplied with the power supply with the second voltage or the power supply with the third voltage; and wherein the level of the third voltage is higher than the level of the second voltage and the second or third voltage is directly forwarded to the connection interface in order to supply the conveyor device connected thereto.

19. The conveyor according to claim 18, wherein the level of the third voltage is twice as high as the level of the second voltage.

20. The conveyor according to claim 18, wherein the control unit generates a fault connection function when a voltage different in level from the first voltage is supplied to the first energy interface; and wherein the fault connection function causes the voltage at the level of the second or third voltage, respectively, not to be passed on to a logic control circuit integrated in the control unit and adapted to control the conveyor device.

* * * * *

UNITED STATES PATENT AND TRADEMARK OFFICE
CERTIFICATE OF CORRECTION

PATENT NO. : 11,320,807 B2
APPLICATION NO. : 16/770166
DATED : May 3, 2022
INVENTOR(S) : Henze It is certified that error appears in the above-identified patent and that said Letters Patent is hereby corrected as shown below:

In the Claims

Column 10, Claim 13, Line 21, "a voltage" should be --a third voltage--.

Signed and Sealed this
Sixteenth Day of August, 2022

Katherine Kelly Vidal
*Director of the United States Patent and Trademark Office*